(12) United States Patent
Gierull

(10) Patent No.: US 6,307,178 B1
(45) Date of Patent: Oct. 23, 2001

(54) METHOD FOR WELDING SHAPED BODIES MADE OF CARBURIZED HEAT-RESISTANT STEEL

(75) Inventor: Horst Gierull, Gelsenkirchen (DE)

(73) Assignee: Ruhr Oel GmbH, Gelsenkirchen (DE)

( * ) Notice: Subject to any disclaimer, the term of this patent is extended or adjusted under 35 U.S.C. 154(b) by 0 days.

(21) Appl. No.: 09/462,673

(22) PCT Filed: Jul. 8, 1998

(86) PCT No.: PCT/EP98/04234

§ 371 Date: Mar. 21, 2000

§ 102(e) Date: Mar. 21, 2000

(87) PCT Pub. No.: WO99/02298

PCT Pub. Date: Jan. 21, 1999

(30) Foreign Application Priority Data

Jul. 11, 1997 (DE) ............................................. 197 29 781

(51) Int. Cl.[7] ................................ B23K 9/00; B23K 9/04; B23K 25/00
(52) U.S. Cl. .............................. 219/137 WM; 219/76.12; 219/76.14; 219/76.15
(58) Field of Search ...................... 219/137 WM, 219/76.14, 76.12, 76.15

(56) References Cited

U.S. PATENT DOCUMENTS

| | | | |
|---|---|---|---|
| 2,133,392 | * 10/1938 | Ransom, Jr. et al. | 148/21.5 |
| 3,891,820 | * 6/1975 | Debray | 219/76 |
| 4,097,711 | * 6/1978 | Banerjee | 219/76.15 |
| 4,379,745 | * 4/1983 | Polizzotti et al. | 208/132 |
| 4,424,083 | * 1/1984 | Polizzotti et al. | 148/12 E |
| 4,790,473 | * 12/1988 | Narasimhan et al. | 228/206 |
| 4,948,936 | * 8/1990 | Landry | 219/76.14 |
| 5,116,571 | * 5/1992 | Abe et al. | 420/110 |
| 5,205,466 | * 4/1993 | Ker | 228/125 |
| 5,850,069 | * 12/1998 | Betts | 219/137 R |
| 5,853,502 | * 12/1998 | Aihara et al. | 148/319 |
| 5,879,480 | * 3/1999 | Hetzner | 148/644 |
| 6,126,897 | * 10/2000 | Aihara et al. | 420/106 |

OTHER PUBLICATIONS

Welding Technology Welding Handbook, vol. 1, 8th Edition, 1987; pp.4–5.*
Metals Handbook, vol. 6, 9th Edition, 1983; pp. 320–324.*
Metals Handbook, vol. 4, 9th Edition, 1981; pp.623–626.*
Metals Handbook, vol. 8, 8th Edition, 1978; p. 275.*

* cited by examiner

*Primary Examiner*—Tom Dunn
*Assistant Examiner*—Zidia Pittman
(74) *Attorney, Agent, or Firm*—Oblon, Spivak, McClelland, Maier & Neustadt, P.C.

(57) ABSTRACT

The invention relates to a method for welding shaped bodies of carburized heat-resistant austenitic steel. The inventive method is characterized in that carburized steel parts to be welded are preheated to temperatures of 700 to 900 degrees Celsius before welding, and the preheated carburized steel parts are welded with current intensities of 50 to 200 A.

19 Claims, No Drawings

METHOD FOR WELDING SHAPED BODIES MADE OF CARBURIZED HEAT-RESISTANT STEEL

The subject matter of the invention is a process for welding shaped bodies of carburized heat-resistant steel.

High-alloy heat-resistant steels are generally used for the production installations for industrial manufacture of basic chemicals. Examples of such installations are hydrogen reformers, installations for synthesis of ammonia, methanol and olefins, cracking installations and heat-treatment furnaces. In these installations the materials are used for reformer pipes, headers, lines, furnace rollers and other components. Heat-resistant cast-steel grades can be used at temperatures in excess of 600° C. and are insensitive in contact with aggressive gaseous substances. The materials generally have the following composition: 0.3 to 0.5 wt % carbon, 1.0 to 2.5 wt % silicon, <1.5 wt % manganese, 20 to 50 wt % chromium and 10 to 70 wt % nickel. The phosphorus and sulfur contents of these steels are very low. By virtue of their high carbon content and a high content of chromium and nickel alloying elements, these materials have excellent heat resistance and good mechanical characteristics even at high temperatures.

In the use of these alloys, however, the problem arises that, because of the high operating temperatures and the effect of the different gas mixtures present in the installations, they gradually become aged and embrittled after a certain operating time. As a result, intermetallic phases are precipitated and carbide precipitates are formed. The materials also become carburized or nitrided.

In turn, the mechanical characteristics of the materials are considerably altered. The tensile strength and elongation after fracture decrease greatly, and a loss of elongation is suffered.

From the prior art it is known that heat-resistant cast-steel grades should be welded without preheating if at all possible or with only slight preheating to lukewarm condition, and that postweld treatment is not required. Such information can be found, for example, in DIN 17465 of August 1993, Table 6.

The "Manual for Welding Engineering", 5th Edition, March 1939, pages 84, 89 also states that heat-resistant steels have very low thermal conductivity and greater thermal expansion than unalloyed steels. It is therefore recommended that welding always be performed with the method that inputs the least quantity of heat to the workpiece. From page 89 it can be inferred that these materials must be welded in the cold condition.

The article of R. Malisius entitled "Shrinkages, stresses and cracks during welding" in the "Welding Engineering" textbook series, page 20, paragraph 2.52, "Heat-resisting steels", 1957 also contains information on the welding of heat-resistant steels. It is stated that, in order to reduce the sensitivity of the heat-resistant steels to thermal stresses, it can be expedient slowly to heat the parts to be welded to about 200° C. before welding. In addition, postweld annealing with slow uniform heating and cooling is recommended in order to anneal out the very high internal stress and the hardness variations.

The article by Heribert Wirtz entitled "The behavior of steels during welding" in the "Welding Engineering" textbook series, 44, 1st Edition, March 1968, pages 143 to 147 also states that heat-resistant austenitic steels must be welded in cold condition if at all possible. It is indicated that high preheating temperatures in combination with the input welding heat cause local hot spots, which result in cracking.

This article recommends, for the welding of root passes, preheating in the range of 100 to 150° C., or for thick-walled workpieces up to 200° C. This temperature, however, must not be exceeded.

To ensure trouble-free operation over the long term, individual parts of the installations must be replaced after a certain operating time. For this purpose it is frequently necessary to make welded joints between old and new parts. Because of the differences between the mechanical characteristics of different old parts and also of old parts and new parts, considerable problems can develop in joining such parts by welding, or even in weld surfacing of old shaped parts with new material. The hot-cracking tendency of the materials is worsened by the increased carbon content. The formation of a carbide network due to carburization leads to embrittlement of the material, and so internal welding stresses cannot be relieved by local yielding and therefore lead to cracks.

In joining different old parts as well as old and new parts by welding, and also in weld surfacing, therefore, cracks are frequently formed to the extent that the welded workpiece is no longer usable. This causes not only high material costs but also considerable production stoppages, since the installations must be shut down during these welding tasks. The prior art methods described in the foregoing therefore have not proved practical, since cracks have frequently been observed in the joined parts during welding thereof.

The technical object of the invention is to provide, for welding of shaped bodies of carburized heat-resistant steel, a process which permits simple joining of carburized heat-resistant steel to new parts by welding or even permits weld surfacing, without the development during welding of cracks that lead to material damage.

This technical object is achieved in that the parts to be welded are preheated to temperatures of 700 to 900° C., preferably 800 to 900° C. before welding, and are welded with current intensities of 50 to 200 A.

It was surprisingly found that welding of carburized heat-resistant steel with corresponding new parts or even other carburized heat-resistant old parts is possible in simple manner when the parts to be welded are preheated to the cited high temperatures before welding and are welded at high current intensities. By virtue of these newly discovered preheating and welding parameters, the weldability of carburized shaped parts can be restored, while at the same time the internal stresses are relieved and crack-free welds can be achieved.

The welding method according to the invention can be used both for weld surfacing and for joining by welding.

In a preferred embodiment, weld surfacing is performed by the TIG welding technique. This is an electric inert-gas-shielded welding process using nonconsumable tungsten electrodes.

Preferably chromium-containing and nickel-containing alloys or nickel-base alloys are used as filler metals for welding. Especially preferred are the following alloys:

Thermanit Nicro 82 SG-Ni CR 20 Nb (2.4648)
Thermanit Nicro 82 E-Ni Cr 19 Nb (2.4648)
Sandvik Sanicro 71 EL-Ni Cr 19 Nb
Thermanit 25/35 Nb Si (1.4853)
Thermanit 25/35 R (1.4853) 25/35 Nb or alloys with composition corresponding to that of the base metal.

In a preferred embodiment, the heat-resistant steel is an austenitic steel. Preheating is preferably performed starting from the weld side wall toward the base metal, and the soaking depth during preheating can be 10 to 50 mm.

In a preferred embodiment, the buildup of layers during welding can take place from the outside, in which case the workpieces to be welded together are reheated after each weld pass, so that the preheating temperature of 700 to 900° C. is maintained throughout the entire welding process. The thickness build-up per pass is preferably 6 to 8 mm.

Preferably a postweld heat treatment at temperatures of 850 to 900° C. is performed after joining by welding, in order to achieve effortless removal of the welding slag. After welding, the weld is allowed to cool slowly to room temperature. Preferably the weld is thermally insulated for this purpose.

The parts to be replaced are preferably welded together without solution annealing. Solution annealing is understood as heat-treatment, at about 1200° C., of the workpieces to be welded together, for a relatively long period of about 4 hours, followed by cooling to room temperature. In the case of welding of hollow shaped bodies, build-up of the sidewall structure is preferably performed by welding at 60 to 140 A and build-up of the filler passes and top pass at 90 to 200 A. Preheating is performed with an oxy-gas flame. Tacking of the parts to be welded is performed after heatup. Furthermore, stress-relief annealing is also not performed after welding.

With the welding method according to the invention it is even possible to weld together carburized materials which had already yielded negative weld specimens and were therefore classified as no longer weldable. In subsequent tests the welded workpieces did not exhibit any cracks or any further hardening phenomena in the heat-affected zones. The welding behavior of the steels corresponded to the joint between two new parts.

By means of the process according to the invention it is possible to make joints between old/old materials and old/new materials and to recondition elbows, headers and wye joints and to join them to new pipe segments, which can then be rewelded without problems into the corresponding installations.

By means of the process according to the invention, therefore, the welding times for corresponding repair tasks are considerably shortened. Whereas weld surfacing and subsequent inspection required approximately 7.5 hours in prior art processes, completion times of about 65 minutes are possible with the process according to the invention. For completion of an old/old or old/new joint of 150 mm diameter by welding, about 4 hours was needed in the prior art process but only about 40 minutes is needed with the process according to the invention.

Hereby both the material costs and the repair costs are greatly reduced, and also the stoppage times of the production installations are shortened. The process according to the invention can be used for old/old joints of materials without weld surfacing, for old/new joints without weld surfacing, for repair welding of cracked welds and for reconditioning of shaped parts. The parts to be welded do not have to be examined for weldability.

The invention will be explained in more detail by means of the following examples.

EXAMPLE 1

Weld surfacing of carburized partition pipes

A pipe segment is cut approximately 150 mm above the weld to the shaped part (elbow/wye joint). The pipe segment is mechanically chamfered at an angle of 30° on the inside and outside in the weld zone to a width of about 20 mm and a depth of at least 1 mm. The surface is ground and the edges are rounded. Thereafter the end face is examined for incipient cracks. The part to be welded is then heated to 820 to 850° C., such that the workpiece turns light cherry red to bright red. Preheating is performed by means of an oxy-gas flame, starting from the weld side wall toward the base metal. The soaking depth during preheating is about 25 mm.

Thereafter TIG welding is performed using the following filler metals:

Thermanit Nicro 82 SG-Ni CR 20 Nb (2.4648)

Thermanit Nicro 82 E-Ni Cr 19 Nb (2.4648)

Sandvik Sanicro 71 EL-Ni Cr 19 Nb

Thermanit 25/35 Nb Si (1.4853)

Thermanit 25/35 R (1.4853) 25/35 Nb or alloys with composition corresponding to that of the base metal. Layer buildup takes place from the pipe outside. Surfacing is performed with a current intensity of 170 A. The filler wire is fed at an adequate rate. A tungsten electrode with thickness $\geq 3.2$ mm is used. Reheating to 850 to 900° C. is performed after each pass. The thickness buildup is at least 6 to 8 mm. Brief reheating to 850° C. takes place after the last pass. Thereafter the weld is thermally insulated and allowed to cool slowly to about 80° C. A weld chamfer of 30° is then machined mechanically. Finally the built-up weld is inspected for incipient cracks by FED inspection.

EXAMPLE 2

Joining of a surfaced old part to a new part (pipe) by welding

Two pipes are welded together with one another. First of all the surfaced weld edge is chamfered mechanically at an angle of 30°. The new pipe segment, which is about 150 mm long, is also chamfered at an angle of about 30°. In a further step the new pipe is tacked to the surfaced workpiece, leaving an air gap of 3 to 4 mm. During TIG tacking, the root side must be shielded with nitrogen-hydrogen mixture.

In one option, welding is performed by making the root by means of a manual electric welding technique and the filler passes and top pass by means of the TIG welding technique. Alternatively, the root as well as the filler passes and top pass can be made by the TIG welding technique. During TIG welding, the root side is shielded with 90:10 or 80:20 nitrogen-hydrogen mixture or with nitrogen. As filler metal there can be used the following alloys:

Thermanit Nicro 82 SG-Ni CR 20 Nb (2.4648)

Thermanit Nicro 82 E-Ni Cr 19 Nb (2.4648)

Sandvik Sanicro 71 EL-Ni Cr 19 Nb

Thermanit 25/35 Nb Si (1.4853)

Thermanit 25/35 R (1.4853) 25/35 Nb or alloys with composition corresponding to that of the base metal.

The interpass temperature is 120° C. Layer buildup takes place from the root side. The current intensity is 130 A for the root and 160 A for the intermediate passes and top pass.

EXAMPLE 3

Completion of old/old joints by welding

Old parts in the form of a carburized old wye joint, a carburized old elbow and a carburized old pipe were used as materials. The weld was prepared by first of all grinding out cracks and signs of damage at an included angle of 60°, over part or all of the pipe circumference. Thereafter preheating to about 820 to 850° C. was performed, the entire circumference of the pipe being heated. Two oxy-gas flames are used for this purpose. The preheating zone extends at least 25 mm from the weld center.

Welding is performed by a manual electric technique. This is used both for the root and for the filler passes and top pass. The preheating temperature must be maintained throughout the entire welding time. This is ensured by reheating after each pass. The root is welded with a current intensity of 90 A and the intermediate passes and top pass with 120 A. As filler metals there are used those listed in Example 1.

After the last pass has been welded, reheating to 850° C. is performed to remove the slag. The welded parts are allowed to cool to inspection temperature in stationary air, ensuring that abrupt cooling does not occur. It is therefore preferable to protect the welded parts with insulating material, in order to ensure slow cooling. After cooling to inspection temperature (room temperature), the top pass must be ground to notch-free condition over the entire circumference.

After completion of the welding tasks, the top pass is inspected visually and also by the FED technique.

EXAMPLE 4

Completion of old/new joints by welding

An old carburized wye joint, an old carburized elbow and a new pipe are to be joined by welding. For weld preparation, the weld side wall of the old parts is first of all chamfered at an angle of 30°. Thereafter an FED inspection is performed. The new part is also chamfered at an angle of 30°. Thereafter the entire circumferences are preheated to about 820 to 850° C. by means of two oxy-gas flames and then tacked. Each preheating zone must extend at least 25 mm from the weld center.

Manual electric welding is used as the welding technique. The root as well as filler passes and top pass are built up by means of manual electric welding. The preheating temperature must be maintained throughout the entire welding time, and so reheating is performed after each welding pass. The root is welded with a current intensity of about 70 A and the intermediate passes and top pass with 120 A. As filler metals there are used those cited in Example 1. After application of the last pass, reheating at 850° C. is performed to remove the slag. Cooling to inspection temperature is then allowed to take place under insulating material. In the process it must be ensured that abrupt cooling does not occur. After cooling to inspection temperature (room temperature), the top pass is cleaned and if necessary ground to notch-free condition over the entire circumference. After completion of the welding tasks, the top pass is inspected visually and also by the FED technique.

What is claimed is:

1. A process for welding shaped bodies of carburized heat-resistant austenitic steel, characterized in that carburized steel parts to be welded are preheated to temperatures of 700 to 900° C. before welding, and the preheated carburized steel parts are welded with current intensities of 50 to 200 A.

2. A process according to claim 1, characterized in that preheating takes place at temperatures of 800 to 900° C.

3. A process according to claim 1, characterized in that welding is performed as weld surfacing or as joining by welding.

4. A process according to claim 1, characterized in that weld surfacing is performed by mean of a TIG welding technique.

5. A process according to claim 1, characterized in that the parts to be welded are preheated starting from the weld side wall toward the base metal.

6. A process according to claim 1, characterized in that a soaking depth during preheating is 10 to 50 mm.

7. A process according to claim 1, characterized in that a buildup of layers during welding takes place from the outside.

8. A process according to claim 1, characterized in that workpieces to be welded together are reheated to temperatures of 700 to 900° C. after each built-up weld pass.

9. A process according to claim 1, characterized in that a postweld treatment at temperature of 850 to 900° C. is performed after joining by welding, in order to remove slag.

10. A process according to claim 1, characterized in that a thickness build-up per pass is 6 to 8 mm.

11. A process according to claim 1, characterized in that the carburized steel parts are hollow shaped bodies, and build-up of a side wall is performed by welding at 60 to 140 A and build-up of filler passes and a top pass is performed by welding at 90 to 200 A.

12. A process according to claim 1, characterized in that preheating for weld surfacing is performed with an oxy-gas flame.

13. A process according to claim 1, characterized in that preheating for joining by welding is performed by means of two oxy-gas flames.

14. A process according to claim 1, characterized in that tacking of the parts to be welded is performed after heatup.

15. A process according to claim 1, characterized in that stress-relief annealing is not performed after welding.

16. A process according to claim 1, characterized in that the weld is thermally insulated after welding, in order to achieve slow cooling to room temperature.

17. A process according to claim 1, characterized in that joining by welding is performed by means of two welding torches.

18. A process according to claim 1, characterized in that joining by welding is performed by means of a manual electric welding technique.

19. A process according to claim 1, characterized in that a weldability examination is not performed.

* * * * *